United States Patent

[11] 3,552,365

| [72] | Inventor | Joseph E. Williams |
| --- | --- | --- |
| | | St. Leonard, Quebec, Canada |
| [21] | Appl. No. | 717,227 |
| [22] | Filed | Mar. 29, 1968 |
| [45] | Patented | Jan. 5, 1971 |
| [73] | Assignee | Montreal Locomotive Works, Limited |
| | | Montreal, Quebec, Canada |
| [32] | Priority | Apr. 4, 1967 |
| [33] | | Great Britain |
| [31] | | No. 15324/67 |

[54] POWER CONTROL APPARATUS FOR AN ENGINE
2 Claims, 5 Drawing Figs.

[52] U.S. Cl. ..................................................... 123/103, 137/81.5
[51] Int. Cl. ..................................................... F02d 11/08
[50] Field of Search ........................................... 60/39.25, 39.28; 123/103

[56] References Cited
UNITED STATES PATENTS

| 2,874,764 | 2/1959 | Booth ........................... | 137/36X |
| 3,199,523 | 8/1965 | McEdthron .................. | 137/26 |
| 3,248,043 | 4/1966 | Taplin .......................... | 60/39.28X |
| 3,347,103 | 10/1967 | High ............................. | 137/36UX |
| 3,410,287 | 11/1968 | Heydon ........................ | 137/36 |

*Primary Examiner*—Clarence R. Gorden
*Attorney*—Alan Swabey

ABSTRACT: A speed regulating mechanism for an engine or other power unit, made up of a governor and speed-setting device. The governor is connected to the power unit and drives a speed-sensing centrifugal device which acts on a diaphragm in a servovalve mechanism, in response to engine speed. The speed-setting device supplies an opposing force to the diaphragm so that the servovalve mechanism is moved by the resultant force of the respective centrifugal and speed-setting device to adjust engine speed. The speed-setting device is a fluidic control responsive to operator speed setting and is subject to overriding control signals dependent on engine parameters, including the condition of the lubricating system, engine-intake manifold pressure, abnormal ambient temperature, and atmospheric pressure.

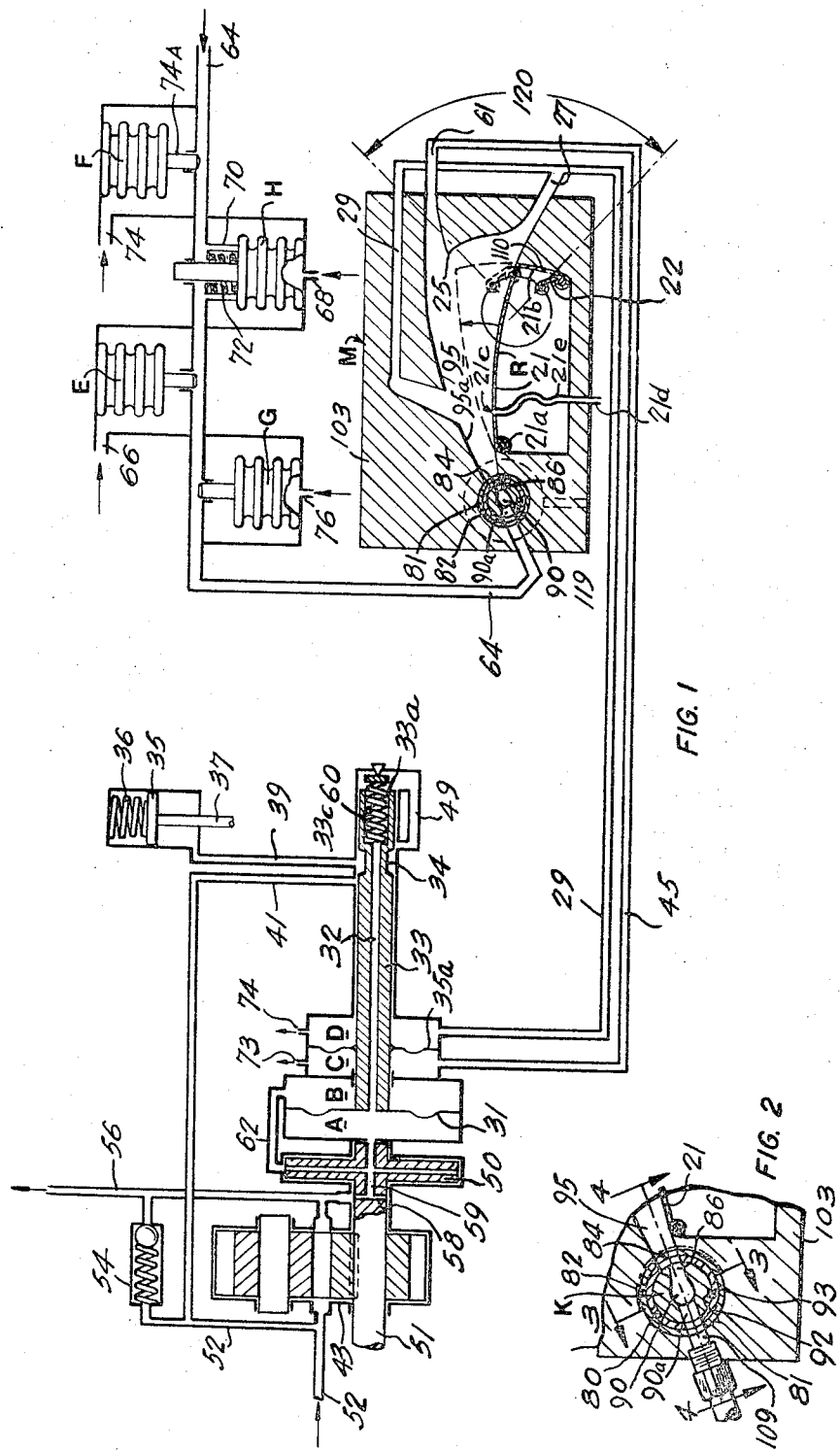

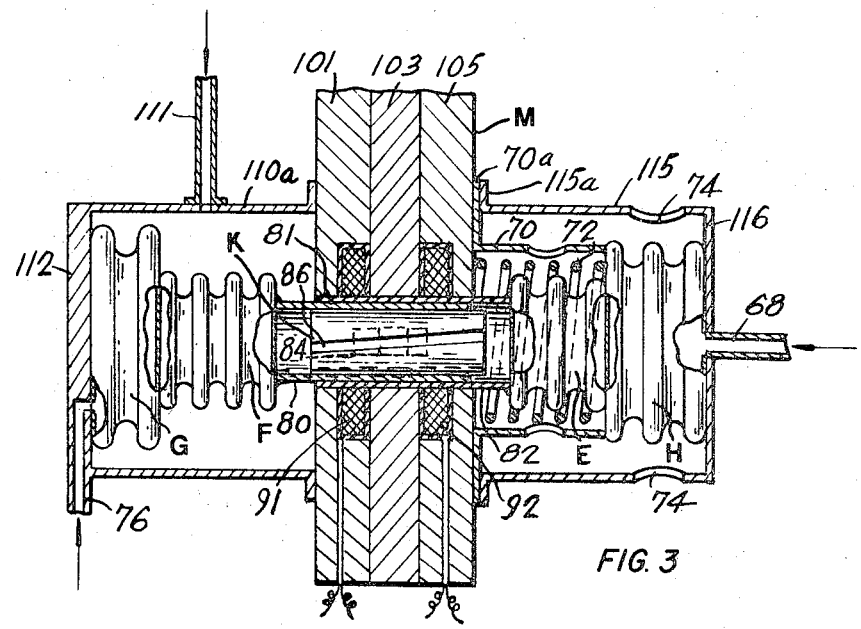
FIG. 3
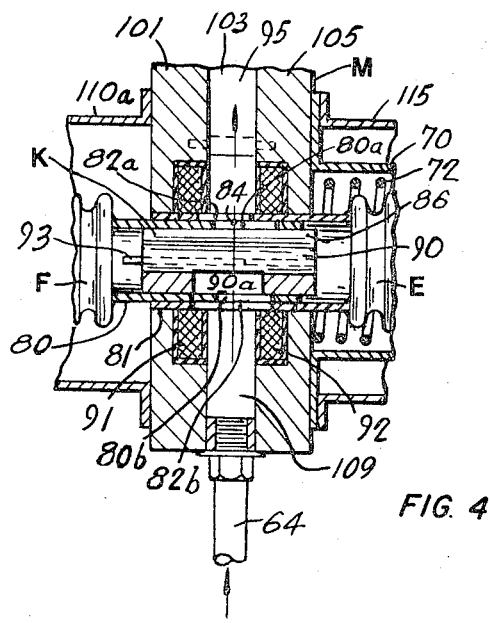
FIG. 4
INVENTOR
Joseph E. Williams
ATTORNEY INVENTOR
Joseph E. Williams

ATTORNEY

POWER CONTROL APPARATUS FOR AN ENGINE

This invention relates to fluid amplifier control of prime movers.

At the present time, prime movers are usually controlled by mechanical governing means, sometimes assisted by hydraulic amplifiers or relays. These are generally complex and cumbersome, give rise to inertia effects, are unreliable under severe environmental conditions, for example, vibration, temperature and humidity, and most require some form of compensation to maintain constant speed against varying load.

An aim of the present invention is to reduce these disadvantages and to provide positive advantages as will become apparent from the following description.

The modus operandi of the control system of the invention is based on the application of static pressure and flow control. A working fluid pressure is developed by centrifugal force proportional to the speed of the power apparatus controlled, translated into movement by servomeans in a hydraulic circuit governing fuel flow to the engine. The servomeans is also responsive to a proportional fluidic amplifier under operator control which determines engine speed and may be modulated in response to several variable forces for which it is desirable to compensate.

More specifically in a preferred embodiment of the invention the servomechanism is acted on by a first diaphragm subject to the working fluid pressure, and this first diaphragm in turn moves a servovalve and hydraulic circuit to control the fuel flow to the power apparatus. The speed of the power apparatus is determined by control fluid flow acting on another diaphragm which opposes the action of the first. The fluid flow to the two sides of the second diaphragm is provided by the proportional fluid amplifier having one or more control inputs either manual or fluidically operated. Preferably there are a number of inputs responsive to the demands of the power unit and which control the variable factors. These inputs are superimposed on a main operator-controlled input which determines the speed of the apparatus.

The fluid amplifier includes movable airfoil means for directing the control fluid proportionally to the control outlets of the amplifier, this airfoil means may include a spring metal leaf articulated for movement in relation to the control stream. In this way, the inclination of the airfoil surface to the control stream as well as its curvature may be varied. Valve means for controlling the air stream entering the amplifier may control mass flow as well as the direction of flow into the control chamber to achieve further control independent of or in conjunction with the airfoil control.

More specific aspects of the invention will be described in the detailed description to follow.

This detailed description is keyed to the accompanying drawings, which illustrate preferred embodiments of the invention, and in which:

FIG. 1 is a schematic view partly in elevation and partly in cross section showing a governor unit connected to a proportional fluid amplifier;

FIG. 2 is an enlarged fragmentary cross section showing a valving arrangement for introducing control fluid into the fluid amplifier;

FIG. 3 is a longitudinal cross section as along the line 3-3 of FIG. 2, partly in elevation, showing a typical arrangement of a fluid amplifier;

FIG. 4 is a longitudinal cross section as along the line 4-4 of FIG. 2, partly in elevation.

Figure 5:
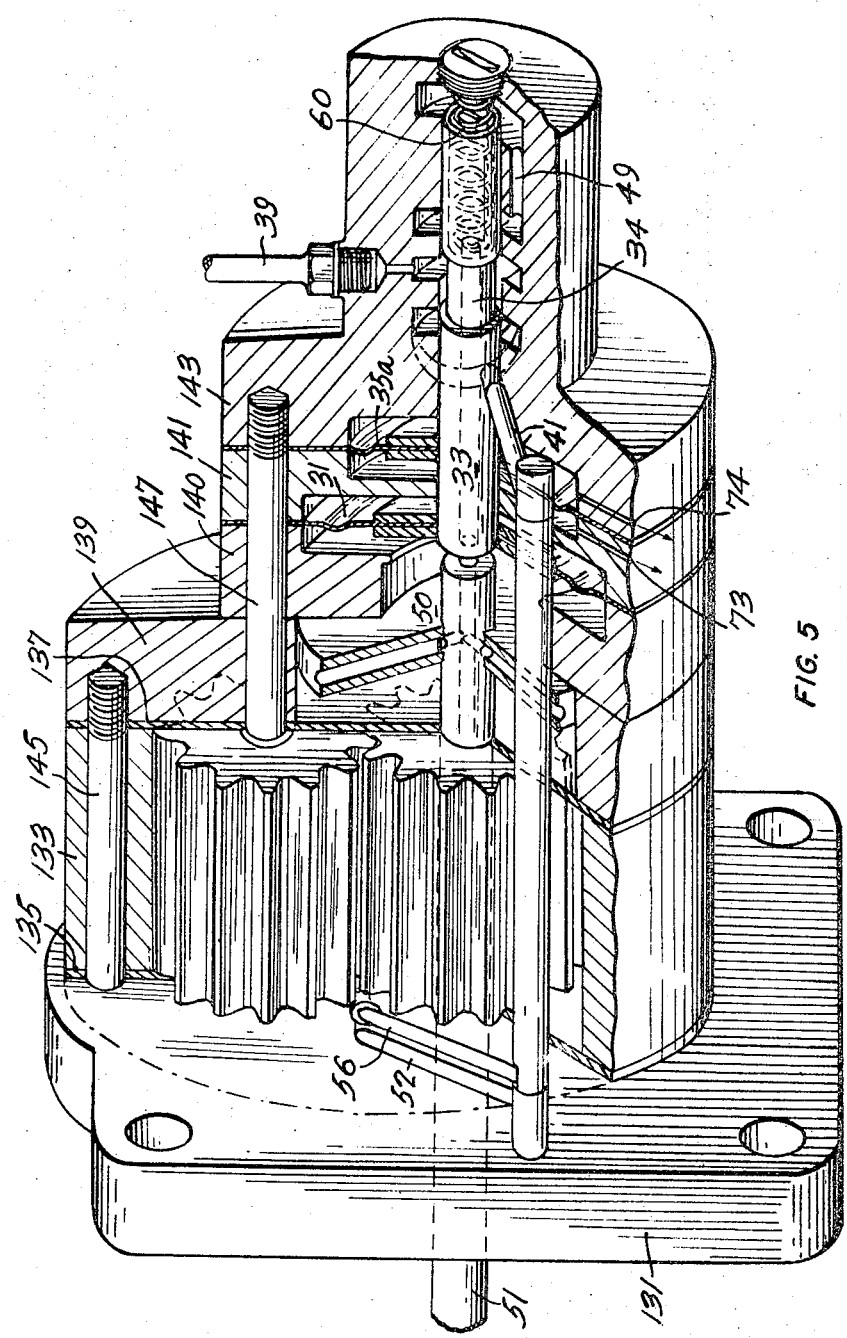
FIG. 5 is a perspective view, partly in cross section, of a typical arrangement of a governor unit.

FIG. 1 shows the arrangement of the various parts of a typical apparatus according to the invention and the connections between them, in this example a diesel engine governor (shown at the left-hand side of FIG. 1) connected to a proportional fluid amplifier (shown at the right-hand side of FIG. 1). The mechanisms are spread out schematically so as to be more easily understood. In practice the mechanisms will be in self-contained units, preferred examples of which are later described.

GOVERNOR UNIT

In this instance, the control apparatus is used to control a diesel engine and the fuel of the diesel engine is used as the working fluid of the governor. The engine shaft is 51. A servovalve assembly 33 is in axial alignment with the shaft 51.

Fuel enters the inlet line 52 from a fuel supply (not shown). The fuel passes into the left-hand side of the booster pump 43 and thence to the center of the drive shaft 51 through a passage 58 in the shaft 51. 54 is a relief valve and the line 56 leads therefrom to the fuel injection pumps (not shown).

A boring 59 in the shaft 51 leads the fuel to a centrifuge 50 where its pressure is increased in relation to the speed of the engine and then through a line 62 to the chamber B of a diaphragm assembly. Fuel enters the chamber A by way of the boring 59. From chamber A the fuel passes through an axial passage 32 through the stem 33 of a pilot or servovalve 33 in the chamber 33a passed the spring 60 to the right of the servovalve stem 33 and reaches the inlet port of the servovalve through the line 49. A passage 41 leads from the exhaust port of the servovalve to the inlet line 52. A pipe 39 leads from the center port 33c of the servovalve to the actuator cylinder of which the actuator shaft is shown at 37 and the actuator piston at 35. A spring 36 acts against the piston 35 to oppose the fuel pressure on the piston.

A pressure-responsive diaphragm 31, of suitable elastomeric material, separates the chambers A and B. A fluid pressure-responsive diaphragm 35a, of a suitable elastomeric material, separates the chambers C and D and is acted on by the pressure of fluid through the lines 45, 29 from a proportional amplifier.

A preferred arrangement of governor unit is shown at FIG. 5.

Similar numbers have been given to the parts of this unit as applied in the schematic view of FIG. 1. Where necessary, additional reference numerals are applied to identify the parts in the arrangement of FIG. 5.

This unit has a base 131 which is adapted to be mounted on the power unit. A pump housing 133 is mounted on the base and sandwiched between two thrust plates 135 and 137. A centrifuge housing 139 is mounted on the outer thrust plate 137 of the pump housing. A fluid transfer support 140 is mounted on the centrifuge housing. A diaphragm housing 141 is mounted on the support 140. A servovalve housing 143 is mounted on the diaphragm housing. The outer margin of the diaphragm 31 is sandwiched between the transfer support 140 and the diaphragm housing 141. The outer margin of the diaphragm 35 is sandwiched between the diaphragm housing 141 and the valve housing 143. Bolts 145 extend through the base 131 to the centrifuge housing 139 and clamp these parts together. Member 147 which serves as a shaft for a pump impeller extends through the base 131 to the valve housing 143 and clamps these two parts and intermediate parts together.

The various components of the assembly are appropriately provided with the necessary passages, as shown in the drawings, and as explained in the description keyed to schematic FIG. 1.

PROPORTIONAL FLUID AMPLIFIER

In the proportional fluid amplifier, fluidic supply pressure from a source of compressed air is maintained by a reducing valve (not shown) at a selected pressure, for example, 5 to 8 p.s.i., and passes through the line 64 into the amplifier. The fluidic pressure reaching the amplifier is also initially modulated by a bellows system which is to be described.

A bellows E is influenced by the pressure in the air inlet manifold of the engine which enters through the line 66, thereby modifying the fluidic pressure to control the acceleration rate of the engine.

A bellows H is directly connected to the lubricating oil system of the engine through a line 68. The bellows H under normal circumstances is seated on a shoulder of a tube 70 in the bellows assembly and does not move. The air passes freely to the amplifier without any pressure drop. But, should the lubricating oil pressure fall below a predetermined level a spring 72 takes over and moves the bellows H away from its seating on the tube 70 and assembly H closes the fluidic supply line 64. This cuts off the fluidic pressure which in turn stops the engine.

A bellows G reacts to extra low temperatures sensed through the line 76 and causes the bellows through its plunger to close the passage 64 when the temperature falls below a certain limit. This is to reduce excessive supercharging pressure to the engine which occurs at certain extremes of temperature.

A bellows F is a sensor of atmospheric pressure through a line 74 and controls the fluidic pressure to suit variations in atmospheric pressure through its plunger 74a.

In the schematic view, the four bellows have been shown as separate units. In actual practice these bellows may be combined into a single unit and a preferred arrangement is shown in FIGS. 3 and 4.

According to the construction of FIGS. 3 and 4, the bellows are assembled into a subassembly with bellows G and F connected together and bellows E and H connected together. There is thus one liquid filled bellows G,H being to the outside of the assembly.

The preferred form of fluid amplifier shown in FIGS. 3 and 4 comprises a block M of sandwich construction, made up of juxtaposed plates 101, 103 and 105. The central plate 103 is cut away to provide an amplifier chamber 95, outlet channels and a bypass channel corresponding to these channels as shown in FIG. 1. The configuration of a preferred chamber 95 is substantially as shown and its wall has a projection 25 or splitter between the outlets 61 and 27.

The block M is provided at one end with a transverse cylindrical opening 81 constituting an air valve chamber and leading from an inlet channel 109 to a reduced initial part of the chamber 95.

Tubes 80 and 82 and a core K extend through the valve chamber 81 and function to control the air passing through this chamber from the inlet channel 109 to the chamber 95, as will be described.

To provide for proportional control of the fluid to the outlets 27 and 61 respectively a preferred airfoil device is provided as follows. A spring steel member R has a body 21 pivoted to the block M, as at 21a, and which extends across the bottom of the chamber 95 and has a leg 21b extending downwardly in contact with a cam surface 110 forming a part of the block M. The member R is stressed so that its body 21 is flexed to assume a curved contour having desirable fluidic control characteristics and which when the member R is in the lower position as shown forms a continuation of the adjacent surface of the wall of the chamber 95. The contour of the body 21 is preferably varied by the movement of the arm 21b relative to the cam surface 110. A link 22 is pivotally connected to the end of the arm 21b and to the throttle, shown diagrammatically by the circle 120. Movement of the throttle in a circular direction causes movement up or down of the member R and consequently its control surface.

In the amplifier, a preferred form of airfoil is shown in the form of a metal spring R. This construction is used for ease of manufacture and because it provides good surface smoothness. It also achieves easy mechanical maneuverability and controlled change in airfoil shape.

In the broader aspects of the invention the part R could be replaced by a movable inflexible member, for example, a block or plate. However, the use of a spring member is by far preferred for reasons described elsewhere and because of the ability to vary the contour of the control surface and thus to provide maximum adhesion of the control fluid at various inclinations of the member R relative to the inlet and outlet ports. The contour of the body 21 is designed to provide superior adhesion of the stream of control fluid passing to the surface from the inlet. Varying this contour as the member R is moved up or down alters the contour at the various inclinations of the member R to maintain good laminar adhesion of the control fluid.

Mounted on the plate 105 through a flange 70a is the open ended tubular cylindrical support 70 and outside the support through a flange 115a a cylindrical bellows housing 115. The housing 115 has a wall 116 remote from the plate 105 on which is mounted one end of the bellows H. The opposite end of the bellows H bears against the end of the support 70. A coil spring 72 acts between the plate 105 and the bellows H. On the other end of the bellows H is mounted one end of the bellows E, the other end of which is connected to the tube 82. The housing 115 has an entrance 68 leading to the inside of the bellows H and entrances 74 leading to the atmosphere.

Mounted on the plate 101 is a cylindrical bellows housing 110a. Remote from the plate 101, the housing 110 has and end wall 112 on which is mounted the bellows G. The bellows F is mounted on the other end of the bellows G and the tube 80 is connected to the bellows F. The housing 110 has an inlet 76 which leads from a low temperature sensor to the interior of the bellows G and an inlet 111 leading from the atmosphere to the outside of the bellows G and F.

The tube 82 has a sliding fit in the opening 81. The tube 80 slides within the tube 82. The tubes 80, 82 have respective ports 80a, 82a which, in neutral position, line up together and make a rectangular exit port 84 to permit free passage of fluid through both tubes 80, 82. However, the four bellows E, F, G, or H, under the influence of the forces applied to them may alter the size of the port 84 by causing relative movement between the respective tubes 80, 82.

The tubes 80, 82 are also provided with entry ports 80b, 82b respectively, always in register to pass fluid through the tubes 80, 82 to the inside of the tube 80.

Slidably held within the inner tube 80 for controlled movement in either axial direction is a core K. This core is preferably in the form of a metal cylinder provided with an axial passage 90 and extending therefrom to its periphery a helically disposed slot 86. At the opposite face a passage 90a extends from the peripheral surface of the core K to the axial opening 90. Electrical windings 91 and 92 are provided in the amplifier assembly outside the tube 82, connected to a control circuit so as to move the core K, as in a solenoid, in either axial direction within the tube 80. A keyway 92 is provided in the core K and a key 93 in the tube 80 to guide the plunger without rotary movement.

The design of the tubes 80, 82 and the core K is such that the passage 90 is always in communication with the slot 80b of the tube 80 and the slot 86 of the plunger K is always in communication with the port 80a. By this arrangement, control fluid enters through the entry ports 80b, 82b, passes into the core K through the passage 90a, thence through the axial passage 90, then out through the helical slot 86 whence it is projected through the exit port 84 into the amplifier chamber 95 in the form of a control stream or jet.

The mass of fluid entering the chamber 95 is thus controlled by the size of the outlet port 86, that is by the relative positions of the tubes 80, 82 (exit ports 80a, 82a) and the direction of the fluid is controlled by the axial position of the plunger K relative to the variable outlet port 86.

A power control override is also provided in the form of a flexible tube 21a which leads from a passage 21b formed in the wall of the casing M and leads to an opening 21c through the body 21 of the spring arm.

OPERATION

Consider a preferred application of the invention in controlling a diesel locomotive engine. Suppose the engine is stationary. The engineer starts the engine with the conventional starter. As soon as it turns over enough to generate oil pressure, fluidic control fluid, for example, air will enter at 64 from a suitable source of fluid under pressure and will pass the four bellows E, F, G and H through the helical channel 86 and the variable injection port 84 into the fluidic amplifier chamber 95. The control fluid from the port 85 clings to the control surface of the body 21 according to the Coanda effect: and, with R in the lower position as shown in full lines in FIG.

1, in so doing, will pass out through the outlet 27 and through the line 29 into the chamber D.

While this is going on, the pressure of the booster pump 43 will be increasing and the chambers A and B will be coming under the influence of this increased pressure. The supply of fluid pressure will be instantaneous from the supply tanks through line 64 and will allow the chamber D to take charge of the servovalve 33 causing it to move to the left (referring to FIG. 1 of the drawing). This relieves the pressure from beneath the piston 35 and allows the actuator spring 36 to take over and move the piston rod 37 to the bottom of its stroke. Separate means, for example, a pressure booster, are provided to supply the fuel necessary to cause the engine to start.

The fuel pressure in the chamber B, because of the action of the centrifuge 50 and the conditions of pressure in the chambers A, B, C and D, will balance out. Once this happens the servovalve 33 will come to rest at the position shown in the drawing, with the low pressure line 52 and the high pressure line 49 both closed off.

When the engineer wants to increase speed, he advances the throttle 120 as many notches as desired. The throttle is mechanically connected to the engineer's control handle. Turning of the throttle 120 moves the link 22 connected to the main airfoil spring 21 and raises the airfoil R, whereupon the differential pressure leaving the outlet ports 61 and 27 will alter. Initially, the lower port 27 directly connected to the chamber D will have the higher pressure, but as the member R is raised the upper port 61 will progressively receive more and more pressure till eventually it has all the pressure.

As the pressure in chamber C increases, the diaphragm 35a will move to the right (looking at FIG. 1) moving with it the valve stem 33 and the annular channel 34 then lines up with the passageway 49 and the passageway 39. This allows the high pressure fluid from 59 to pass down through the passage 33a in the servovalve passed the spring 60 and return through the passage 49 and up through the line 39 so compressing the spring 35 and moving the actuator 37 upwards to increase the speed of the engine. If the valve moves to the left, the annular passage 34 will line up with the lines 41 and 39 passing fluid between them. This will allow the spring 36 to push the piston 35 down so reducing the fuel supply and the speed of the engine.

As the engine r.p.m. increases, the centrifuge 50, which is directly connected by the drive shaft 51, from the booster pump 43 to the engine cam shaft, will increase speed. The speed of the centrifuge 50 will thus increase, in turn increasing the force in chamber B thereby pushing the diaphragm 31 to the left referring to the drawing) and bringing the servovalve 33 back to its sensitive position.

While this takes place, the turbo-charger pressure is building up. The bellows F contracts as the turbo-charger increases its r.p.m., it being understood that when the engine is first started, the bellows F was fully expanded. Thus, the fluidic supply or mass flow is allowed to increase, allowing a greater flow to come over the airfoil section 21 and now into the upper port. Even though the airfoil 21 has come to rest, pressure in chamber C is slowly increasing as the engine speed increases. Therefore, there is a continuous force tending to increase r.p.m. This controlled increase of r.p.m. is the applicant's means of controlling acceleration of the engine, in accordance with the increase in air manifold pressure to ensure good combustion.

If the fluidic supply pressure fails, the engine will automatically stop, the spring 60 pushing the servovalve over to the left, the diaphragm 55 having become inoperative in the absence of controlling pressure against it.

The differential pressures at the outlets 27 and 61 are controlled by the Coanda effect of the adhesion of the control fluid stream to the control surface of the body 21. This adhesion may be modified by varying the entrance angle of the jet 119 controlled by the position of the helical slot 86 in the core K. For example, if the helical slot is so positioned as to project the air at an angle away from the surface 21 the pressure differential in outlets 27 and 61 is altered to produce an increase in pressure in outlet 61. If, on the other hand, the slot 86 is so inclined that the jet is projected tangentially to the surface 21 the major portion of the flow will be conducted along the surface 21 and out through the outlet 27. If the jet is projected at the middle of its range there will be proportional flow to the respective outlets 61 and 27.

The splitter 25 coacts with the control surface 21 to divide the air stream between the channels 61 and 27. It is proportioned to permit a smooth variation of output pressure, from a maximum at channel 27, and a minimum at channel 61, to a maximum at channel 61, and a minimum at channel 27.

The chamber 95 has an upper concavely curved surface 95a which acts to improve control fluid adhesion to the airfoil surface of the member R.

When the necessity arises to override the normal operating conditions of the amplifier at any position of the airfoil R, air under pressure, through the port 21c in the member R interrupts the control air stream passing through the initial part of the chamber 95 and causes it to go through the bypass 29. This auxiliary air flow is through a dead man's handle or other instrumentality (not shown) which is automatically set into operation if anything should happen to the operator or engineer. The control fluid reaches the opening 21c through a flexible tube 21d leading through the chamber 95 from an opening 21e in the wall of the housing M.

The variable angle of the jet from slot 86 may be used to control a condition requiring control, for example, wheel slip of a diesel locomotive. In this case, the electromagnets which control the movement of the core 118 would be electrically linked in the case of wheel slip, for instance, to a fluidic or electrical system whereby the speed of the slipping wheel would be measured as against the speed of a nonslipping wheel. This intelligence would be passed to the electromagnets through appropriate circuitry. Other conditions could be controlled in a similar way.

The preferred arrangement according to the invention employs an airfoil surface 21 to control the proportional direction of the control stream to the respective outlets in conjunction with which the core K controls the direction of the incoming control stream. Either of these instrumentalities could be used alone for the proportional direction of the control stream to one or other of the outlets 61 and 27. The use of the two, however, gives better control. Accordingly, it is within the scope of the broader aspects of the invention for the core K to be connected to its control system with a manual control whereby the direction of flow into the control chamber 95 may be controlled manually in order to control the engine speed by this means without operating the airfoil surface or by using some other means to achieve the effect of the latter.

I claim:

1. A power control apparatus comprising drive means, power controlling actuator means, regulating means for regulating the actuating means, means connecting the regulating means and drive means whereby the regulating means is responsive to drive speed, proportional fluid amplifier control means including operator-actuated mechanism and means forming a control fluid chamber having spaced apart outlets, means for providing a stream of control fluid into said chamber opposite said outlets and movable airfoil means in said chamber to proportionally direct control fluid to said outlets, and means connecting the fluid amplifier control means and the regulating means whereby the regulating means is actuated to control drive speed.

2. A governor for power control apparatus, comprising a base adapted to be mounted on the power apparatus, a pump housing mounted on said base and sandwiched between two thrust plates, a centrifuge housing mounted on said pump housing on the outer thrust plate of the pump housing, a fluid transfer support mounted on the centrifuge housing, a diaphragm support mounted on the fluid transfer support and sandwiching between them a first diaphragm, a servovalve housing mounted on the diaphragm support and sandwiching between them a second diaphragm, a shaft extending through said pump housing and centrifuge housing, and having a centrifuge mounted thereon, the fluid transfer block and diaphragm support being provided with complementary cavities to provide diaphragm chambers to each side of the first diaphragm, the diaphragm support and servovalve housing being provided with complementary cavities adapted to provide diaphragm chambers at each side of the second diaphragm, and the diaphragm support and the servo valve housing having axial openings therein in axial alignment with the drive shaft providing a servovalve chamber, a servovalve connected to said diaphragms and sliding in the servovalve housing, spaced apart annular grooves in the servovalve housing serving as valve ports leading from the servovalve chamber.